United States Patent
Gneuss

(10) Patent No.: US 6,843,915 B2
(45) Date of Patent: Jan. 18, 2005

(54) CLEANING DEVICE FOR SIEVE DISCS

(75) Inventor: Detlef Gneuss, Bad Oeynhausen (DE)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 0 days.

(21) Appl. No.: 10/457,083

(22) Filed: Jun. 5, 2003

(65) Prior Publication Data

US 2003/0230527 A1 Dec. 18, 2003

(30) Foreign Application Priority Data

Jun. 7, 2002 (DE) .......................... 102 25 601

(51) Int. Cl.$^7$ .......................... B01D 33/15; B01D 33/48; B29C 47/68

(52) U.S. Cl. .......................... 210/330; 210/391; 210/411; 425/199

(58) Field of Search .......................... 210/330, 391, 210/393, 411, 412, 416.1; 425/185, 197, 199

(56) References Cited

U.S. PATENT DOCUMENTS

| | | | | |
|---|---|---|---|---|
| 4,619,600 A | * | 10/1986 | Gneuss | 425/197 |
| 4,850,840 A | * | 7/1989 | Gneuss | 425/182 |
| 5,090,887 A | * | 2/1992 | Gneuss | 425/185 |
| 5,200,077 A | * | 4/1993 | McNeice et al. | 210/323.2 |
| 5,407,586 A | * | 4/1995 | Gneuss | 210/780 |
| 6,325,217 B1 | * | 12/2001 | Hehenberger et al. | 210/411 |
| 6,325,922 B1 | * | 12/2001 | Schaller et al. | 210/90 |

* cited by examiner

*Primary Examiner*—Fred G. Prince
(74) *Attorney, Agent, or Firm*—Friedrich Kueffner

(57) ABSTRACT

A device for cleaning melt filters which are intended for filtering melts, particularly plastic material melts in extruders, and which include at least one moveable sieve disc with one or more exchangeable sieve inserts, wherein at least one sieve insert is moveable into a flow of cleaning medium within the device in such a way that the sieve insert is located above or below an inlet opening of a cleaning duct. The sieve insert is arranged in the sieve disc at a distance from the surface of the sieve disc which faces the inlet opening.

6 Claims, 2 Drawing Sheets

CLEANING DEVICE FOR SIEVE DISCS

BACKGROUND OF THE INVENTION

1. Field of the Invention

The present invention relates to a device for cleaning melt filters which are intended for filtering melts, particularly plastic material melts in extruders, and which include at least one moveable sieve disc with one or more exchangeable sieve inserts, wherein at least one sieve insert is moveable into a flow of cleaning medium within the device in such a way that the sieve insert is located above or below an inlet opening of a cleaning duct.

2. Description of the Related Art

Melt filters have the purpose of mechanically removing impurities from plastic material melts which are used, for example, in extruders. For this purpose, a melt filter includes a metal sieve disc which is provided with several sieve inserts which are arranged one after the other along the circumference.

The sieve inserts can be held at intermediate frames which may be of metal and the sieve inserts may be spaced apart from each other by means of these intermediate frames. Consequently, the intermediate frames simultaneously form separating webs. The sieve inserts themselves can also be made of metal and they can be provided with passage ducts which extend perpendicularly of the plane of extension of the sieve disc, wherein the passage ducts perform a filtering function because of their small diameters.

After a certain time of operation, it is desirable to subject the sieve insert to a cleaning process in order to remove mechanical impurities which would clog the hole ducts. Without this cleaning process, the clogged sieve areas would quickly cause a substantial counter pressure to be built up which would impair the operation of the sieves.

For carrying out the cleaning process, the sieve inserts are subjected to a flow of cleaning medium which is oppositely directed to the direction of the melt flow through the sieve discs. Accordingly, if the melt flow travels through the sieves from top to bottom, the cleaning flow will travel through the sieves from the bottom toward the top, as long as the orientation of the sieves remains the same during the cleaning process.

It is desirable to carry out the cleaning process of the sieve discs with the same effectiveness and speed as the filtering process of the melt, so that both operations can be adapted to each other and carried out simultaneously.

SUMMARY OF THE INVENTION

It is the primary object of the present invention to improve the effectiveness of the cleaning process of sieve discs of the above-described type.

In accordance with the present invention, the sieve insert is arranged in the sieve disc at a distance from the surface of the sieve disc which faces the inlet opening.

As a result of the fact that the present invention provides that the sieve inserts are arranged at a distance from the inlet opening, a preflooding chamber is obtained within the sieve disc. This preflooding chamber can be filled uniformly with cleaning liquid, for example, cleaning melt, so that the throughput thereof is increased. In particular, the invention makes it possible that, compared to cleaning devices without preflooding chamber, the melt, which is subject to chemical changes due to great heat and without further supply of melt in the filtering station, can be replaced earlier by the cleaning melt. A larger surface area of the sieve disc can be cleaned simultaneously. It is ensured that a sieve insert can be completely filled with liquid up to the separating web with the next sieve insert, even if the inlet opening does not completely cover the respective sieve insert. For example, if the sieve inserts are kidney-shaped as seen from the top, a radially extending inlet opening can simultaneously cover several sieve inserts because the opening may be simultaneously located adjacent several sieve inserts.

The inlet opening may be relatively small; however, because of the configuration of the preflooding chamber according to the present invention, it is still possible to cover a large surface area of sieve inserts. The preflooding chamber reduces the pressure of the cleaning liquid and turbulent flow patterns are avoided. The sieve insert is subjected to a precleaning process. In the area of the expanded inlet opening, the cleaning liquid flows essentially in a laminar flow and at high pressure in order to effect the final cleaning process.

Because of its effectiveness, the cleaning device can be particularly advantageously combined with a filtering device for a melt in a machine in such a way that by turning the sieve disc the sieve inserts can be arranged at the cleaning device or the filtering device, so that both processes can be carried out simultaneously.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
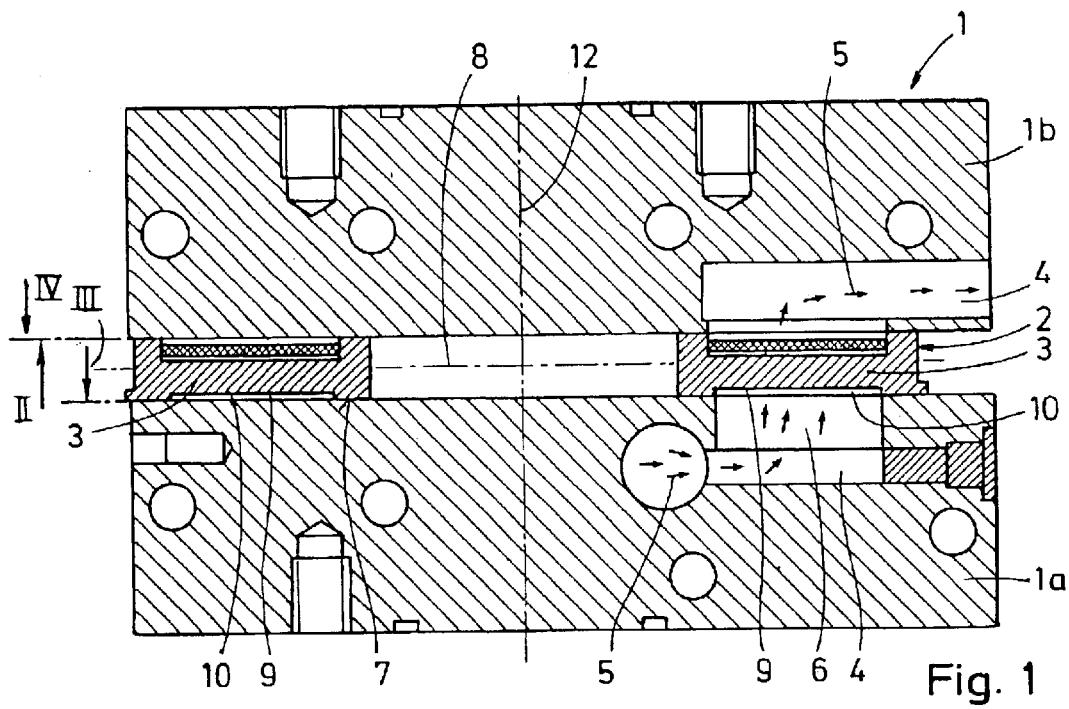
FIG. 1 is a schematic cross-sectional view of the device according to the present invention.

FIG. 1 of the drawing schematically shows a cleaning device 1 for a sieve disc 2 which is provided with several sieve inserts 3. Typically, about ten to fourteen sieve inserts 3 are provided. The sieve inserts may be exchangeable. In the cleaning position, the sieve disc 2 is held between two parallel plate bodies 1a, 1b within a cleaning duct 4, wherein an inlet opening 6 for admitting cleaning fluid to the sieve disc 2 is provided in the flow direction 5 of the cleaning fluid.

Figure 4:
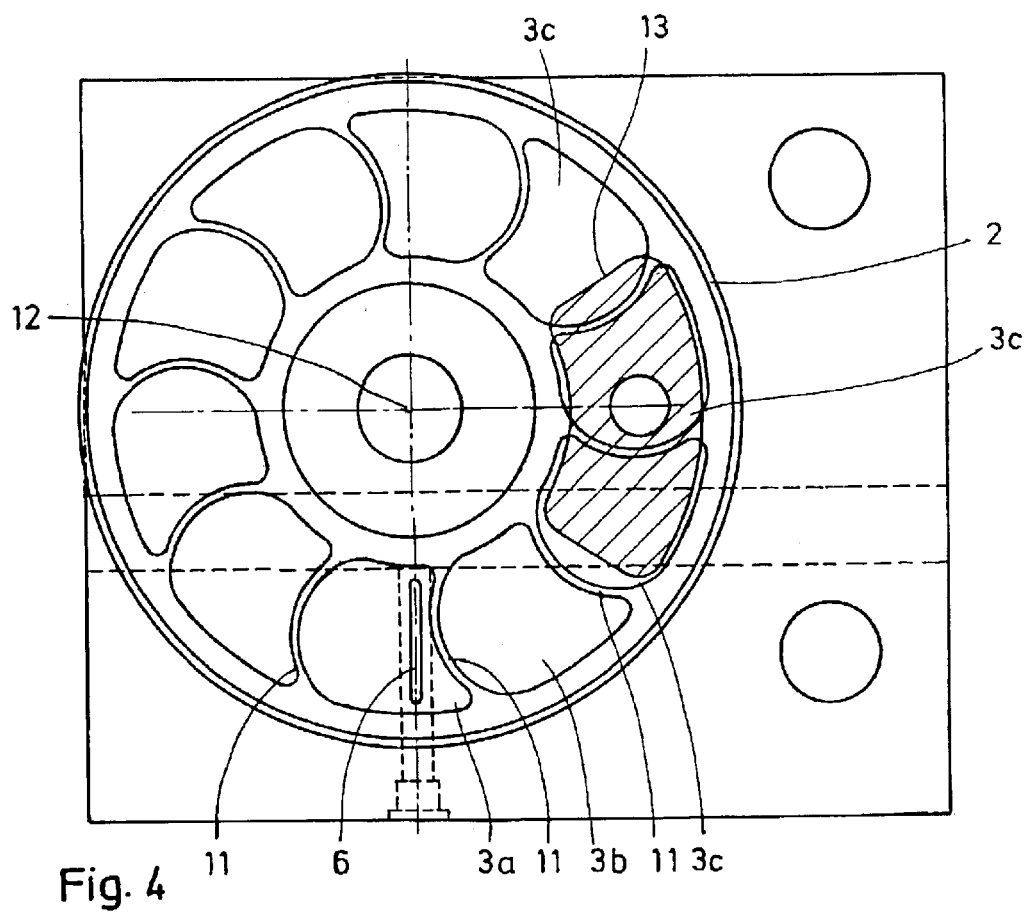
FIG. 4 is a view taken in the direction of arrow IV in FIG. 1 showing a top view of a sieve disc with a preflooding chamber located therebelow.
Figure 2:
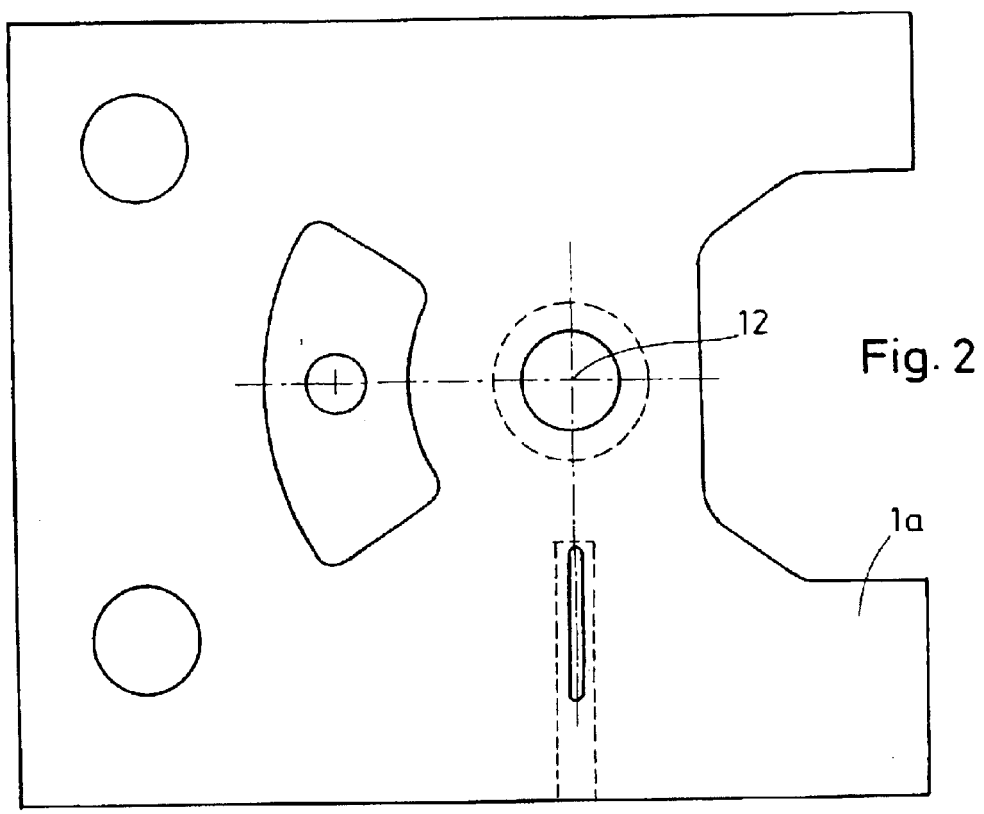
FIG. 2 is a view in the direction of arrow II in FIG. 1.
Figure 3:
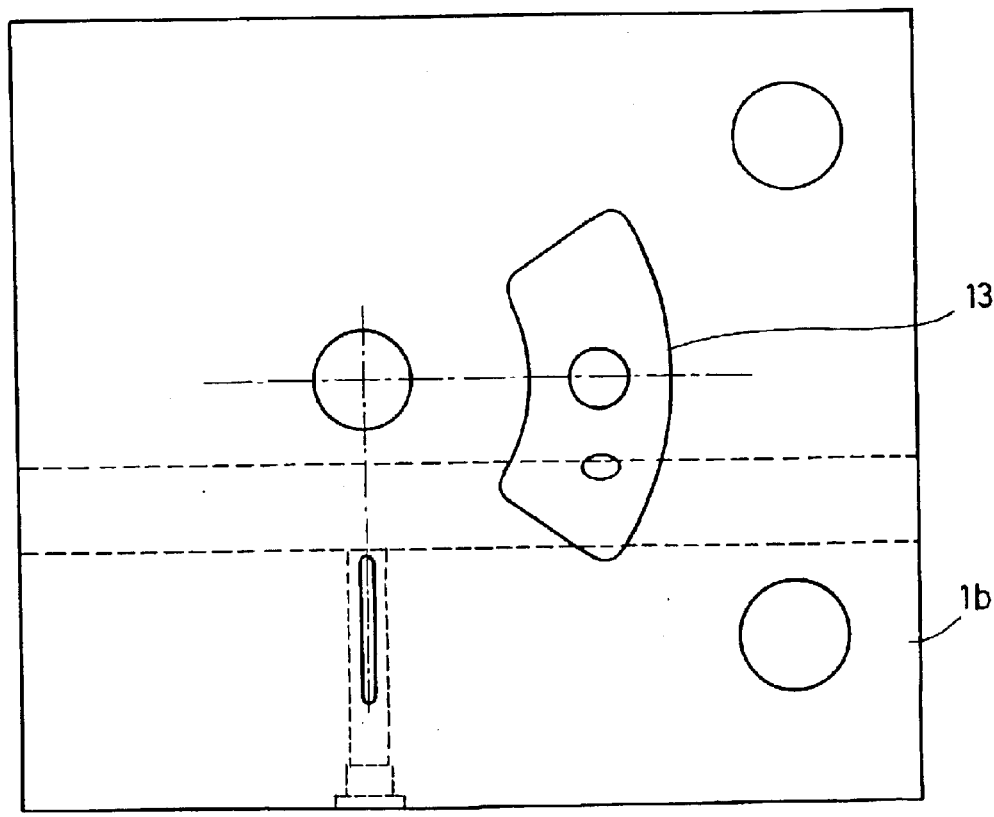
FIG. 3 is a view in the direction of arrow III in FIG. 1.

As illustrated in FIG. 4, the sieve disc 2 has a circular shape and the inlet opening 6 is slot-shaped; the inlet opening 6 extends at least over a substantial distance in the radial direction of the sieve disc 2 and reaches up to the outer edge of the sieve disc 2. The sieve disc 2 is rotatable about a central axis 12, so that the sieve inserts 3 can be moved successively into the area covered by the inlet opening 6.

The fluid flow 5 emerging from the inlet opening 6 can impinge upon several sieve inserts 3. In the position of the sieve disc 2 illustrated in FIG. 4, fluid 5 is admitted only to one sieve insert 3a. When the sieve disc 2 is further rotated about the axis 12, the kidney shape of the sieve inserts causes the fluid 5 to be admitted simultaneously to the sieve inserts 3a and 3b.

Perpendicularly of the plane of extension 8 of the sieve disc 2, the sieve inserts 3 are arranged at a distance from the surface 7 facing the inlet opening 6 and, thus, are inwardly offset relative to the surface 7. This creates in front of the front edge 9 of the sieve inserts 3 a preflooding chamber 10 which is defined laterally outwardly by separating webs 11 which separate the sieve inserts 3 from each other. The sieve inserts 3 may be exchangeable. The preflooding chamber 10 is located within the sieve disc 2.

The preflooding chamber 10 makes it possible to maintain the laminar flow 5, which is particularly advantageous for achieving a uniform cleaning action. Thus, essentially the same conditions prevail in the preflooding chamber 10 for all hole ducts, except for those which are located opposite the inlet opening 6, so that the sieve inserts 3a, 3b shown in FIG. 4 are both cleaned uniformly. Accordingly, as compared to conventional cleaning devices, the surface area which can be actively cleaned at the same time is substantially increased.

A minimum distance of the front edge 9 of the sieve insert 3 from the surface 7 is required; this distance is several millimeters. Typically, the distance is about two to twelve millimeters, wherein the distance is chosen in dependence on the viscosity of the melt. A good distance is about four millimeters, in which case the flow resistance in the preflooding chamber 10 is not too great, on the one hand, and, on the other hand, the flow 5 does not tear off and turbulences are avoided.

Since the preflooding chamber 10 is located within the sieve disc 3 as seen in FIG. 1, cleaning fluid 5 is still simultaneously and completely admitted to the sieve inserts 3a, 3b even though only some hole ducts of the sieve inserts 3a, 3b are located in front of the inlet opening 6. This is made possible by the preflooding chamber 10 which is filled completely with fluid and whose lateral extension is limited only by the separating webs 11. Consequently, the surface area of the sieve disc 2 to which cleaning fluid 5 can be admitted in one cleaning step is significantly increased.

The sieve disc 2 can also very effectively be used simultaneously as a melt filter and, for example, by a continuous or intermittent rotation about the axis 12, the sieve disc 2 can be placed partially in a cleaning position and partially in a filtering position. Those areas which have become clogged in the filtering position can then be directly moved into the cleaning position. Other sieve inserts 3c can simultaneously be placed underneath a melt supply opening 13 of the upper plate body 1b, wherein the melt supply opening 13 supplies this areas 3c with melt to be filtered, and wherein the melt supply opening 13 may extend over several sieve inserts 3c.

While specific embodiments of the invention have been shown and described in detail to illustrate the inventive principles, it will be understood that the invention may be embodied otherwise without departing from such principles.

I claim:

1. A device for cleaning a melt filter for filtering melts, the device comprising at least one moveable sieve disc with at least one sieve insert, wherein the at least one sieve insert is moveable into a flow of cleaning medium within the device so that the at least one sieve insert is located above or below an inlet opening of a cleaning duct, wherein the at least one sieve insert is arranged in the sieve disc at a distance from a surface of the sieve disc facing the inlet opening.

2. The device according to claim 1, wherein the sieve disc is rotatable.

3. The device according to claim 1, wherein the device is configured to act also as a filtering device.

4. The device according to claim 1, wherein the sieve disc comprises a plurality of sieve inserts, wherein at least one of the sieve inserts is subjected to a cleaning medium and at least another of the sieve inserts is subjected to a melt for filtering the melt.

5. The device according to claim 1, wherein the sieve disc comprises a plurality of sieve inserts, and wherein the inlet opening of the cleaning duct extends across at least two of the inserts.

6. The device according to claim 1, wherein the distance of the sieve inserts from the surface of the sieve disc is two to twelve millimeters.

* * * * *